United States Patent

Lofstrom et al.

[11] Patent Number: 5,908,522
[45] Date of Patent: Jun. 1, 1999

[54] SUPPLEMENTAL LEADING EDGE WEAR STRIP FOR A ROTOR BLADE

[75] Inventors: Sven R. Lofstrom, Irving; Troy E. Penny, Grapevine, both of Tex.

[73] Assignee: Composite Technology, Inc., Grand Prairie, Tex.

[21] Appl. No.: 08/965,921

[22] Filed: Nov. 7, 1997

[51] Int. Cl.$^6$ ............................. B29C 73/04; B64C 11/26
[52] U.S. Cl. .......................... 156/94; 29/402.09; 416/224
[58] Field of Search .............................. 156/94, 245, 285, 156/310; 29/402.09, 889.71; 416/224

[56] References Cited

U.S. PATENT DOCUMENTS

| | | | |
|---|---|---|---|
| 3,999,888 | 12/1976 | Zincone | 416/224 |
| 4,832,252 | 5/1989 | Fraser | 29/402.13 |
| 4,842,663 | 6/1989 | Kramer | 156/98 |
| 5,033,938 | 7/1991 | Fraser | 29/402.07 |
| 5,174,024 | 12/1992 | Sterrett | 29/889.71 |
| 5,306,120 | 4/1994 | Hammer | 416/224 |
| 5,542,820 | 8/1996 | Eaton | 416/224 |
| 5,782,607 | 7/1998 | Smith | 416/224 |

*Primary Examiner*—Daniel Stemmer
*Attorney, Agent, or Firm*—Gregory M. Howison; Mark W. Handley

[57] ABSTRACT

A method is disclosed for repairing a worn helicopter rotor blade made of composite materials by adhesively securing a supplemental leading edge abrasion wear strip made of nickel to the leading edge of the rotor blade. The periphery of the bonding surface of the leading edge of the rotor blade is masked. The bonding surfaces of the supplemental leading edge strip and the rotor blade are cleaned with a medium-grit scrubbing pad, grit-blasted with aluminum oxide and then rinsed with DI water. A strip of a structural adhesive film is hot bonded to the bonding surface of the supplemental leading edge strip using vacuum and a high temperature oven cure. The side of the structural adhesive film bonding surface which will be secured directly to the rotor blade bonding surface is first abraded and then wiped with a solvent. An epoxy adhesive mix is applied to the bonding surfaces of the rotor blade and the structural adhesive film of the supplemental leading edge strip. The supplemental leading edge strip is then placed in position upon the leading edge of the rotor blade, positive pressure is applied and the adhesive mix is cured using a lower temperature cure than that used for hot bonding the structural adhesive film to the supplemental leading edge strip. Adhesive run-out from the mix is then faired to smoothly contour the interface between the supplemental leading edge strip, the cured adhesive mix and the previous surface of the rotor blade.

15 Claims, 7 Drawing Sheets

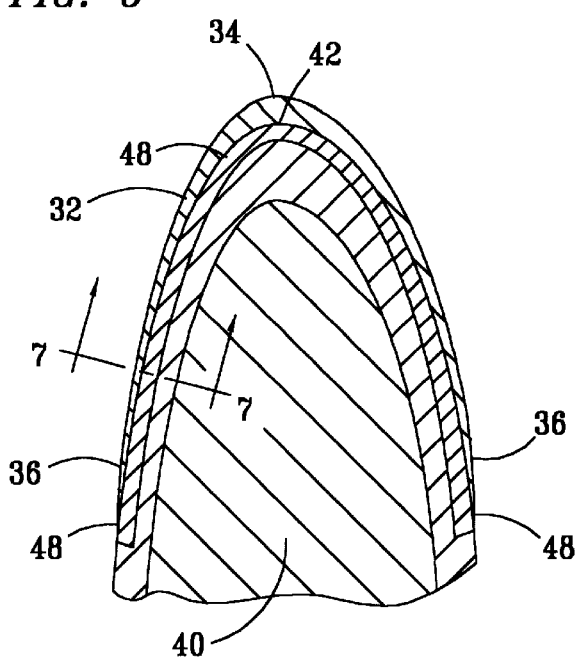
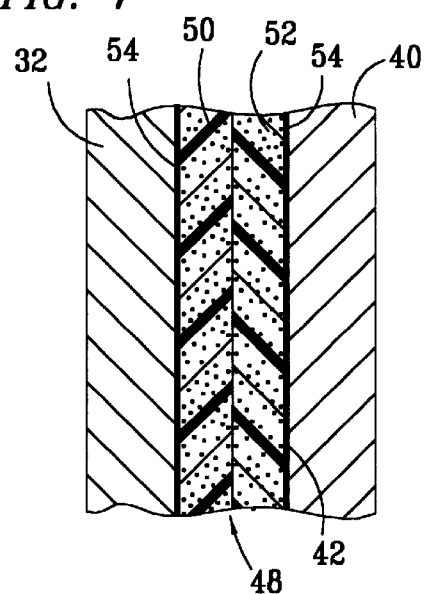
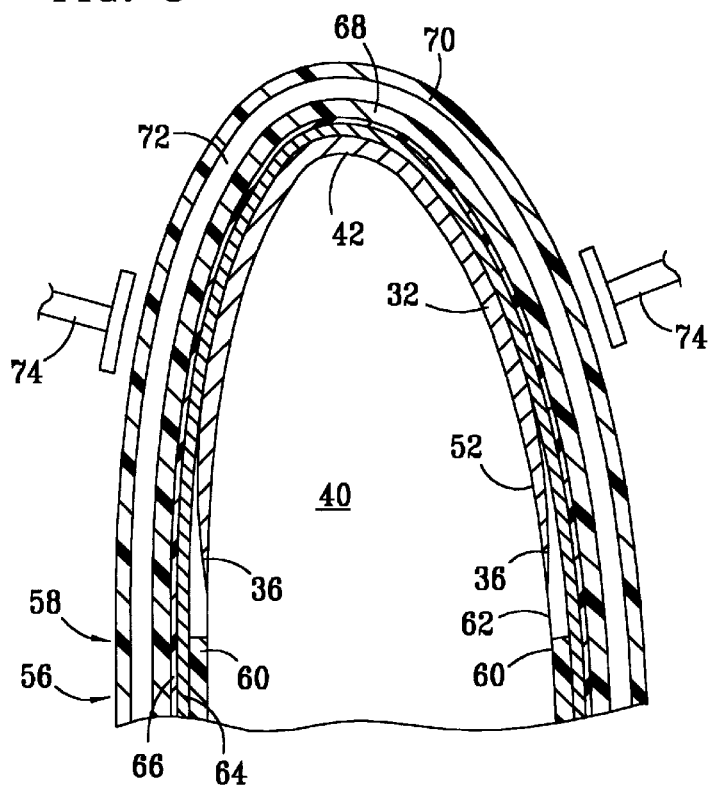

SUPPLEMENTAL LEADING EDGE WEAR STRIP FOR A ROTOR BLADE

TECHNICAL FIELD OF THE INVENTION

The present invention relates in general to the repair of rotor blades and, in particular, to a procedure for repairing a leading edge abrasion wear strip of a helicopter rotor blade.

BACKGROUND OF THE INVENTION

A helicopter rotor blade has a leading edge at the forward end thereof. The outboard end of the leading edge of the rotor blade travels faster than the inboard portion of the leading edge since the inboard portion is closer to the axis of rotation of the rotor blade than the outboard end. The outboard end of the leading edge of the rotor blade is thus subjected to more abrasion and erosion than the inboard portion due to the faster rotational speeds at which the outboard end travels through air, such that the outboard end of the leading edge will wear much more rapidly than the inboard portion of the rotor blade. To compensate for the increased wear encountered on the leading edges of rotor blades, leading edge abrasion wear strips have been provided on the leading edges of prior art rotor blades. Prior art leading edge abrasion wear strips have been provided by stainless steel, titanium and electroformed nickel components which are mounted to the leading edges of the prior art rotor blades.

Prior art rotor blades have, in the past, been made of metal. Typically, structural components of prior art rotor blades were provided by blade spars, which were made of metal. The prior art leading edge abrasion wear strips were mounted directly to the blade spars, and in some cases, they were adhesively secured. These prior art abrasion wear strips provided erosion protection, extending the service life of the prior art rotor blades. In some cases, the leading edge abrasion wear strips were structural components of the rotor blades.

After a period of time, the prior art leading edge abrasion wear strips became worn due to abrasion and erosion, and required repair. One prior art repair procedure was to provide a supplemental leading edge abrasion wear strip which fit around the exterior of the outboard end of the original rotor blade leading edge abrasion wear strip. Some of these prior art supplemental leading edge abrasion wear strips were electroformed of nickel, by electroplating the nickel onto a mandrel having the same contoured shape as the prior art rotor blade, such that the electroformed nickel abrasion wear strips would fit securely upon the original rotor blade leading edge strips without adversely affecting the aerodynamic performance of the prior art rotor blades beyond acceptable limitations. The supplemental leading edge abrasion wear strips were typically adhesively bonded to metal blade spars. Structural adhesives were used to provide sufficient strength for securing the supplemental leading edge abrasion wear strips to the outboard ends of the helicopter rotor blades in the presence of rotational forces which occur at the high rotational speeds at which the leading edges of the outboard ends of the blade tips of the helicopter rotor blades travel. In the prior art, the supplemental leading edge abrasion wear strips were hot bonded to the prior art rotor blades, utilizing structural adhesives which were cured at high temperatures.

Recent developments in materials technology have resulted in the use of composite materials for rotor blade structural components. These composite rotor blade structural components cannot withstand the elevated temperatures that are required to adhesively bond supplemental leading edge abrasion wear strips to rotor blades using high temperature, hot bond cures. In the past, since prior art rotor blades on which the supplemental leading edge abrasion wear strips were used did not include composite materials, the structural adhesives used for securing supplemental leading edge abrasion wear strips to the rotor blades were hot bonded, by curing within an oven operating at elevated temperatures, which were in excess of 185° F. (85° C.). However, with advanced composite materials, such as fiberglass, carbon fiber, and the like, the rotor blade structural components cannot be heated to the high temperatures required to adhesively secure supplemental leading edge abrasion wear strips to the rotor blade leading edge surfaces using structural adhesives, which are cured with high temperature, hot bond cures.

Other components have been bonded to the aft ends, or trailing edges, of prior art helicopter rotor blades. Such components have been made of materials such as aluminum, and have had structural adhesives precured to the bonding surfaces thereof so that they may be applied in the field without need of cumbersome in-field surface preparation techniques for preparing bonding surfaces, as is typically required for components made of aluminum.

SUMMARY OF THE INVENTION

The present invention disclosed and claimed herein comprises a method for adhesively securing a supplemental leading edge abrasion wear strip made of nickel to the leading edge of an asymmetrical helicopter rotor blade made of composite materials. The supplemental leading edge abrasion wear strip is formed such that it has cross-section which tapers in thickness as it extends from a forward nose end to a trailing edge of the strip. The periphery of the bonding surface of the leading edge of the rotor blade is masked, and then the bonding surface is cleaned with a medium-grit scrubbing pad, an aluminum oxide grit blast and a DI water rinse. The bonding surface of the supplemental leading edge abrasion wear strip is cleaned with a medium-grit scrubbing pad, grit-blasted with aluminum oxide and then rinsed with DI water. Then, a strip of a structural adhesive film is hot bonded to the bonding surface of the supplemental leading edge abrasion wear strip using vacuum and an oven cure. The side of the structural adhesive film bonding surface which will be secured directly to the rotor blade bonding surface is first abraded and then wiped with a solvent. An epoxy adhesive mix is applied to the bonding surfaces of the rotor blade and the structural adhesive film of the supplemental leading edge abrasion wear strip. The supplemental leading edge abrasion wear strip is then placed in position upon the leading edge of the rotor blade, positive pressure is applied and the adhesive mix is cured using a lower temperature cure than that used for hot bonding the structural adhesive film to the supplemental leading edge abrasion wear strip. An adhesive run out is then faired to contour for aerodynamic performance the interface between the supplemental leading edge abrasion wear strip, the cured adhesive mix and the previous surface of the rotor blade.

BRIEF DESCRIPTION OF THE DRAWINGS

For a more complete understanding of the present invention and the advantages thereof, reference is now made to the following description taken in conjunction with the accompanying Drawings in which:

FIG. 6 illustrates a partial, cross-sectional view of the composite rotor blade and the supplemental leading edge strip of FIG. 5, taken along section lines 6—6, after the supplemental leading edge strip has been mounted to the composite rotor blade according to the present invention;

FIG. 7 illustrates a partial, sectional view of the composite, helicopter rotor blade and the supplemental leading edge abrasion strip of FIG. 6, taken along section line 7—7, and depicts the supplemental leading edge abrasion strip after being mounted to the composite, helicopter rotor blade according to the present invention;

FIG. 8 illustrates a partial, sectional view of the leading edge abrasion strip, the composite, helicopter rotor blade and positive pressure tooling that is being utilized to apply pressure to the supplemental leading edge abrasion strip and to the composite, helicopter rotor blade as a structural adhesive disposed therebetween is being cured according to the present invention;

DETAILED DESCRIPTION OF THE INVENTION

Figure 1:
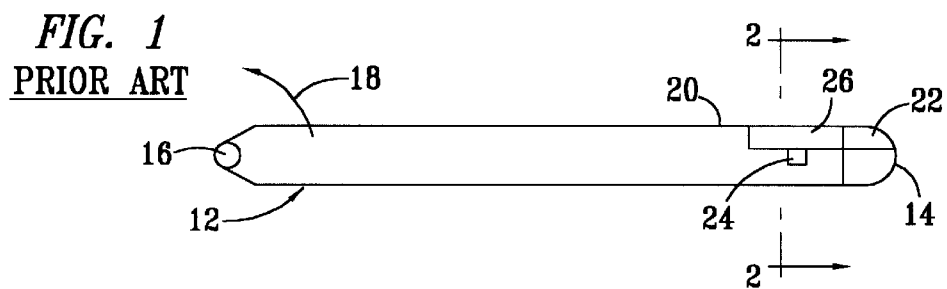
FIG. 1 illustrates a top view of a prior art helicopter rotor blade.

Referring now to FIG. 1, there is illustrated a prior art helicopter rotor blade 12 having a blade tip 14 on an outboard end of the rotor blade 12, which is an opposite end of the rotor blade 12 from a central axis 16 about which the rotor blade 12 rotates. The body of and the tip 14 of the rotor blade 12 rotate around the central axis 16 in an angular direction 18. An outboard portion of the leading edge 20 of the rotor blade 12 travels much faster than the inboard portion of the rotor blade 12. Consequently, air flow, air- borne dust, debris and the like cause abrasion, which leads to erosion of the outboard portion of the leading edge 20. Typically, a splice cover 22 and a weight pocket 24 are also located on the outboard end of the rotor blade 12. A prior art supplemental leading edge abrasion wear strip 26 is mounted to the outboard portion of the leading edge 20 of the prior art rotor blade 12.

Figure 2:
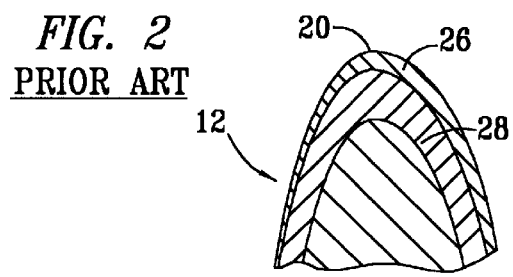
FIG. 2 illustrates a partial, cross-sectional view of the prior art rotor blade taken along section line 2—2 of FIG. 1, and depicts a prior art supplemental leading edge abrasion strip mounted to the prior art rotor blade.

Referring now to FIG. 2, there is illustrated a partial, cross-sectional view of the outboard portion of the leading edge 20 of the prior art rotor blade 12. The prior art supplemental leading edge abrasion wear strip 26 has been mounted to edge 20 by bonding the interior of the supplemental leading edge abrasion wear strip to an original leading edge abrasion wear strip 28, which also provides a structural spar of the rotor blade 12. In the prior art, the rotor blade 12 and the structural spar 28 were made of metal, and as a result, they could withstand the elevated cure temperatures for hot bonding structural adhesives.

Figure 3:
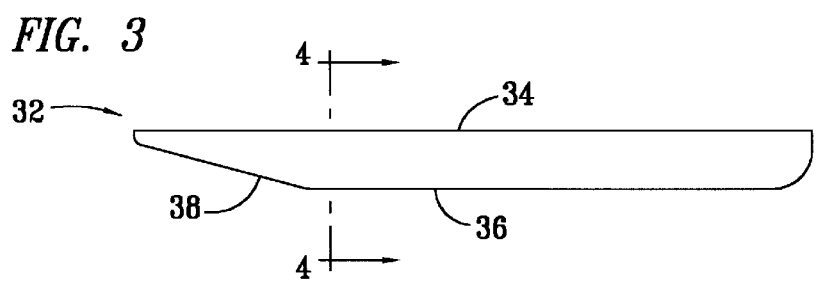
FIG. 3 illustrates a top view of a supplemental leading edge abrasion strip of the present invention.

Referring now to FIG. 3, there is illustrated a top view of a supplemental leading edge abrasion wear strip 32 of the present invention. The supplemental leading edge abrasion wear strip 32 is fabricated according to an electroforming process in which a mandrel as provided having the same profile as that of the original leading edge of the rotor blade to which the supplemental leading edge abrasion wear strip 32 is to be mounted, such that the contour and overall shape of the supplemental leading edge abrasion wear strip 32 will conform to that of the rotor blade to which it is mounted. The electroformed supplemental leading edge strip 32 is manufactured from nickel and then inspected by a fluorescent penetrant inspection process by *Leading Edge Concepts*, 15 Berkshire Blvd., Bethel, Conn. The supplemental leading edge abrasion wear strip 32 has a forward end nose portion 34 and rearward, trailing edges 36. The supplemental leading edge abrasion strip 32 tapers from the forward end nose section 34 to the trailing edges 36. A cut out section 38 is provided on the inboard end of the supplemental leading edge abrasion wear strip 32.

In one embodiment, for repairing a leading edge of a rotor blade for a Bell Helicopter TEXTRON Model No. 412 helicopter, the supplemental leading edge abrasion wear strip 32 has a nominal overall length of approximately 18.0 inches, which defines a longitudinal length, extending in a longitudinal direction, and an nominal overall width of approximately 1.5 inches, which extends traverse to the longitudinal length thereof. The edge of the supplemental leading edge abrasion wear strip 32 which defines the cut out section 38 extends for approximately 4.73 inches in the longitudinal direction of the wear strip 32 (wherein the length of the projection is the portion of the length which extends parallel to the longitudinal length, as a projection), at an angle of approximately 15 degrees to the longitudinal length of the nose portion 34. The corners of the supplemental leading edge abrasion wear strip 32 are radiused, such that they are smoothly rounded.

Figure 4:
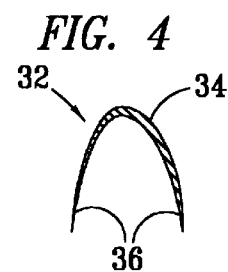
FIG. 4 illustrates a cross-sectional view of the supplemental leading edge abrasion strip of FIG. 3, taken along section line 4—4.

Referring now to FIG. 4, there is illustrated a cross-sectional view of the supplemental leading edge abrasion wear strip 32, taken along section line 4—4 of FIG. 3. The supplemental leading edge abrasion wear strip 32 has an asymmetrical shape of a rotor blade to which it will be secured, and tapers from the forward nose section 34 to the trailing edges 36 as shown. In the embodiment of the supplemental leading edge abrasion wear strip used to repair the above-referenced model 412 rotor blades, the nose section has a nominal thickness of approximately 0.25 inches, and the terminal ends of the trailing edges 35 have a nominal thickness of approximately 0.007 to 0.014 inches.

Figure 5:
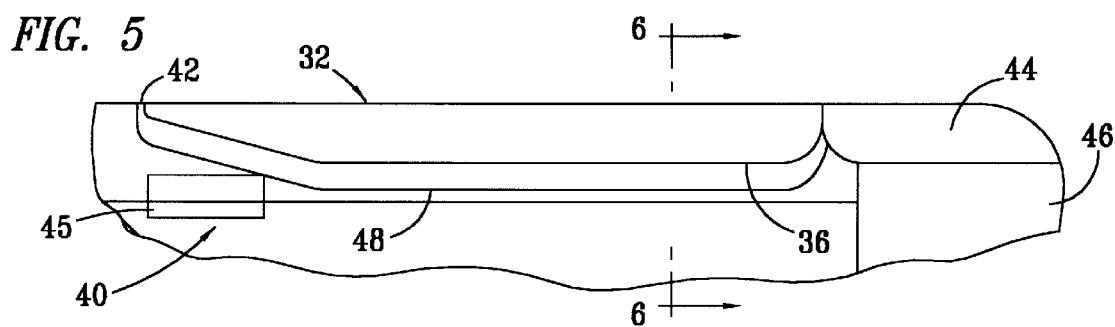
FIG. 5 illustrates a top view of the supplemental leading edge abrasion strip and a portion of a composite rotor blade, after the supplemental leading edge abrasion strip has been mounted to the composite rotor blade according to the present invention.

Referring now to FIG. 5, there is illustrated a partial, top view of a composite rotor blade 40 with the supplemental leading edge abrasion wear strip 32 mounted thereto according to the present invention. The composite rotor blade 40 has a leading edge 42 defined by an original leading edge abrasion wear strip, and a splice cover 44 mounted on an outboard end of the composite rotor blade 40, proximate to a rotor blade tip 46. A balancing weight pocket 45 is located in the composite rotor blade 40, aside the supplemental leading edge abrasion wear strip 32. An adhesive 48 extends around the peripheral rearward edge 36 of the supplemental leading edge abrasion wear strip 32, and is provided by run out of a portion of the adhesive 48 used to secure the supplemental leading edge abrasion wear strip 32 to the leading edge 42 of the composite rotor blade 40. This portion of the adhesive 48 has been faired such that the contour from the trailing edge 36 of the supplemental leading edge abrasion wear strip 32 to the surface of the composite rotor blade 40, which is rearward of the strip 32, has a very smooth transition so as not to interrupt the aerodynamic performance of the composite rotor blade 40.

Referring now to FIG. 6, there is illustrated a partial, cross-sectional view of the composite rotor blade 40, taken along section line 6—6 of FIG. 5. The supplemental leading edge strip 32 has been adhesively bonded to the leading edge 42 of the composite rotor blade 40 with the adhesive 48. The rearward face of the forward nose portion 34 of the supplemental leading edge strip 32 fits snugly against the nose of the leading edge 42 of the composite rotor blade 40, with the rearwardly extending portions of the supplemental leading edge abrasion wear strip 32 extending on opposite sides of the nose of the composite rotor blade 40, tapering to the rearwardly disposed trailing edges 36 and fitting snugly against the composite rotor blade 40.

Referring now to FIG. 7, there is illustrated a partial, sectional view of the composite rotor blade 40, the supplemental leading edge abrasion wear strip 32, and the adhesive 48 bonding the supplemental leading edge strip 32 to the rotor blade 40. Preferably, the adhesive 48 includes an epoxy structural adhesive film 50 and a structural epoxy adhesive mix 52, which are utilized to bond the leading edge abrasion wear strip 32 to the surface of the leading edge 42 of the rotor blade 40 in two separate bonding steps. Additionally, a first layer of primer 54 is applied to the bonding surface of the supplemental leading edge abrasion strip 32 prior to bonding the structural adhesive film 50. A second layer of the primer 54 is also applied to the surface of the composite rotor blade 40 prior to bonding the structural epoxy adhesive mix thereto. In the preferred embodiment, the structural adhesive film 50 is provided by "SCOTCH-WELD®" Epoxy Structural Adhesive Film No. AF-163-2K, available from Minnesota Manufacturing & Mining Co., and having a nominal thickness of approximately 9.5 mils. The adhesive layer 52 is provided by a mixture of Epoxy Adhesive Magnolia™ No. 6391, available from Magnolia Plastics, 5547 Peachtree Industrial Blvd., Chamblee, Ga., which is applied in a layer that is approximately 10 mils thick. The layers of primer 54 are painted layers of corrosion inhibiting primer sold as "SCOTCH-WELD®" BRAND No. EFC-3924D, available from Minnesota Manufacturing & Mining Co, which is applied such that it is relatively thin as compared to adhesive film layer 50 and adhesive layer 52.

Referring now to FIG. 8, there is illustrated a partial, cross-sectional view of the supplemental leading edge abrasion strip 32, the composite rotor blade 40 and pressure tooling 56 during the process of bonding the supplemental leading edge abrasion wear strip 32 to the leading edge 42 of the rotor blade 40. The pressure tooling 56 includes an air bladder 58 which is utilized to apply a positive pressure of approximately twenty pounds per square inch (20 psi) to the exterior of the leading edge abrasion strip 32 as the adhesive 52 is being cured at elevated temperatures. An edge masking 60 is mounted to the composite rotor blade 40, spaced apart from the rearward edges 36 of the supplemental leading edge abrasion strip 32 by a transition section gap 62. A portion of the adhesive mix 52 will run-out from between the supplemental leading edge strip 32 and the composite rotor blade 40 and into the transition section 62 during curing as a result of positive pressure being applied thereto. The run-out of the adhesive mix 52 in the transition section 62 will extend between the masking 60 and the trailing edges 36 after curing. The run-out of adhesive 52 will be contoured, or faired, to provide a smooth transition between the trailing edges 36 of the rearward periphery of the leading edge abrasion strip 32 and the adjacent surfaces of the composite rotor blade 40 which are located in close proximity and disposed underneath the edge masking 60. A release ply fabric 64 is placed against the composite rotor blade 40, the supplemental leading edge abrasion strip 32 and the transition section 62, which extends between the edge masking 60 and the rearward tips 36 of the supplemental leading edge strip 32. A plastic wrap 66 is applied to extend exteriorly of the release ply 64.

The air bladder 58 of the pressure tooling 56 includes an inner rubber layer 68, an outer rubber layer 70, and a pressurized chamber 72 which extends therebetween. Preferably, the chamber 72 is pressurized to approximately twenty pounds per square inch (20 psi) for applying positive pressure to the exterior of the supplemental leading edge abrasion wear strip 32 and the adhesives 48 extending in the transition section 62 as the epoxy adhesive 52 is cured at elevated temperatures. Fixturing 74 is provided by spaced apart ribs which hold the air bladder 58 in place relative to the supplemental leading edge abrasion wear strip 32 and the composite rotor blade 40 during curing of the epoxy adhesive mixture 52.

Figure 9:
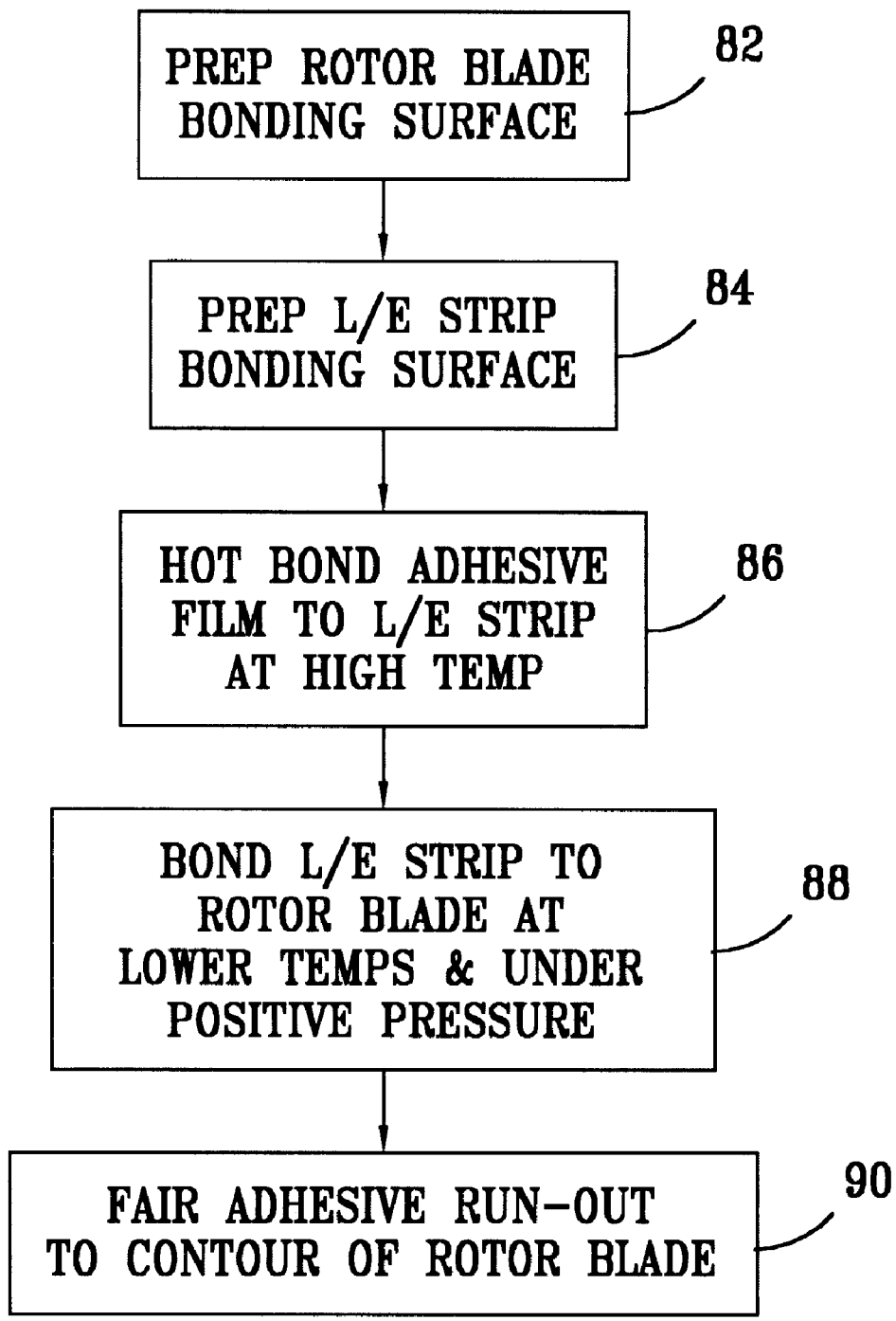
FIG. 9 illustrates a block diagram depicting an overview of a process for bonding a supplemental leading edge abrasion strip to a composite, helicopter rotor blade according to the present invention.

FIG. 9 illustrates a block diagram of an overview of a process for mounting the supplemental leading edge abrasion wear strip 32 to the original leading edge strip of the leading edge 42 of the composite rotor blade 40 according to the present invention. In block 82, the bonding surface of the original leading edge strip of the leading edge 42 of the composite rotor blade 40 is prepared for bonding to an adhesive. Preparation of the supplemental leading edge abrasion strip 32 bonding surface for bonding to an adhesive is depicted by block 84. The methods of preparing the rotor blade bonding surfaces and the supplemental leading edge bonding surfaces of blocks 82 and 84 will be discussed below in more detail. In block 86, the structural adhesive film 50 is hot bonded to the supplemental leading edge abrasion wear strip 32 with an oven cure at temperatures ranging from 225° F. (107° C.) to 245° F. (118° C.). Block 88 depicts the step of bonding of the supplemental leading edge abrasion wear strip 32 to the leading edge 42 of the rotor blade 40 by curing the adhesive mix 52 under positive pressures and at a lower temperature of approximately 160° F. (71° C.), which is lower than the hot bond temperature of block 86. Block 90 depicts the step of fairing of the portion of the adhesive mix 52 of the adhesives 48 in the transition section 62 to smoothly contour the interface between the trailing edges 36 of the supplemental leading edge strip 32 and the proximately adjacent surfaces of the composite rotor blade 40.

Figure 10:
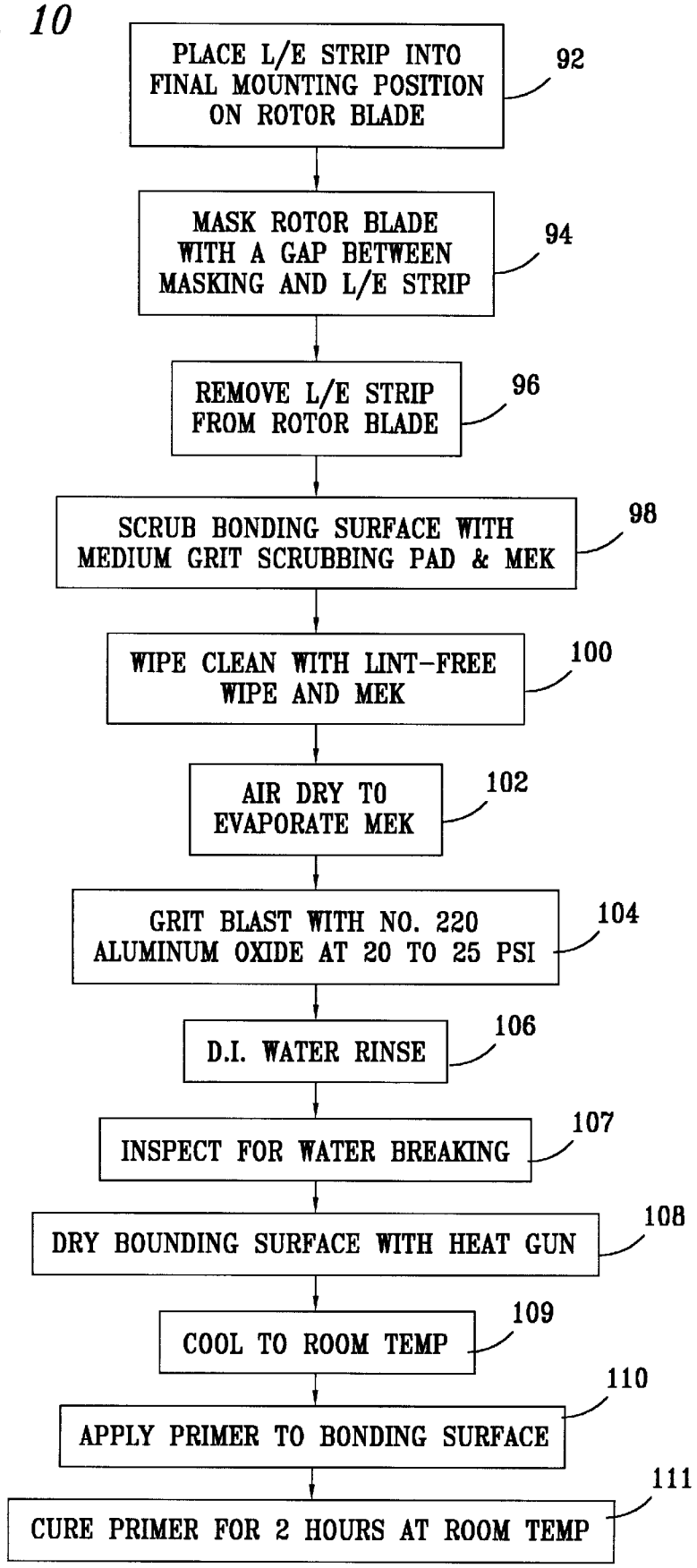
FIG. 10 illustrates a block diagram of a process for preparing the leading edge of the composite, helicopter rotor blade for mounting the supplemental leading edge abrasion strip thereto according to the present invention.

Referring now to FIG. 10, there is illustrated a block diagram of the method for preparing the original leading edge abrasion wear strip of the leading edge 42 of the composite rotor blade 40 which corresponds to the block 82 of FIG. 9. Block 92 depicts the step of placing the supplemental leading edge abrasion wear strip 32 into a final mounting position on the leading edge 42 of the composite rotor blade 40. In block 94, a portion of the surface of the composite rotor blade 40 that is located proximately adjacent to the trailing edges 36 of the supplemental leading edge abrasion strip 32 is masked off, such that there is approximately a one inch (1.0") gap between the forward end of the masking 60 and the trailing edges 36 of the leading edge abrasion strip 32 to provide the transition section 62 depicted in FIG. 8. Then, block 96 represents the step of removing the supplemental leading edge abrasion wear strip 32 from the composite rotor blade 40.

In block 98, the exposed surface in the transition section 62 located adjacent to the masking 60 and the portion of the leading edge 42 of the composite rotor blade 40 which would be disposed underneath the supplemental leading edge abrasion wear strip 32, which is the bonding surface of the composite rotor blade 40, is scrubbed with a medium grit scrubbing pad and a cleaning solvent. Preferably, the cleaning solvent used herein is Methanol Ethyl Ketone ("MEK"). MEK is an industrial cleaning solvent which is commonly available. In the preferred embodiment, the medium grit scrubbing pads utilized herein, both for preparing the bonding surfaces of the supplemental leading edge abrasion wear strip 32 and the original leading edge 42 of the composite rotor blade 40, are provided by "SCOTCH-BRITE®" Medium Grit scrubbing pads, available from Minnesota Mining and Manufacturing Company of Minneapolis, Minn. In block 100, the bonding surface of the leading edge abrasion wear strip 32 is wiped with a lint-free cloth wipe and MEK. Wiping should be continued using a new wipe after each wipe stroke until no discoloration is found on the wipe. Then, in block 102 the MEK should be allowed to evaporate for approximately five minutes.

In block 104, the bonding surface is grit-blasted by holding a grit-blasting gun approximately six inches (6") away from the surfaces being cleaned, and grit-blasting with a material of preferably No. 220 aluminum oxide grit at 20 to 25 psi. In block 106, the bonding surface of the original leading edge strip of the leading edge 42 of the composite rotor blade 40 is rinsed with a deionized water ("DI water") rinse. Toward the latter part of this rinse, the bonding surface is inspected for water breaking, as depicted in block 1 07, to determine when the bonding surface of the leading edge 42 of the composite rotor blade 40 has been sufficiently cleansed. Water breaking will not occur when the surface has been sufficiently cleaned. Block 108 depicts the step of drying the bonding surface of the leading edge 42 of the composite rotor blade 40 with a forced air heat gun. In block 109, the bonding surface of the composite rotor blade 40 is allowed to cool to ambient, room temperatures. Then, block 110 depicts applying the primer 54 to the bonding surface of the rotor blade 40. The primer 54 is then cur ed for two hours at ambient, room temperatures.

Figure 11:
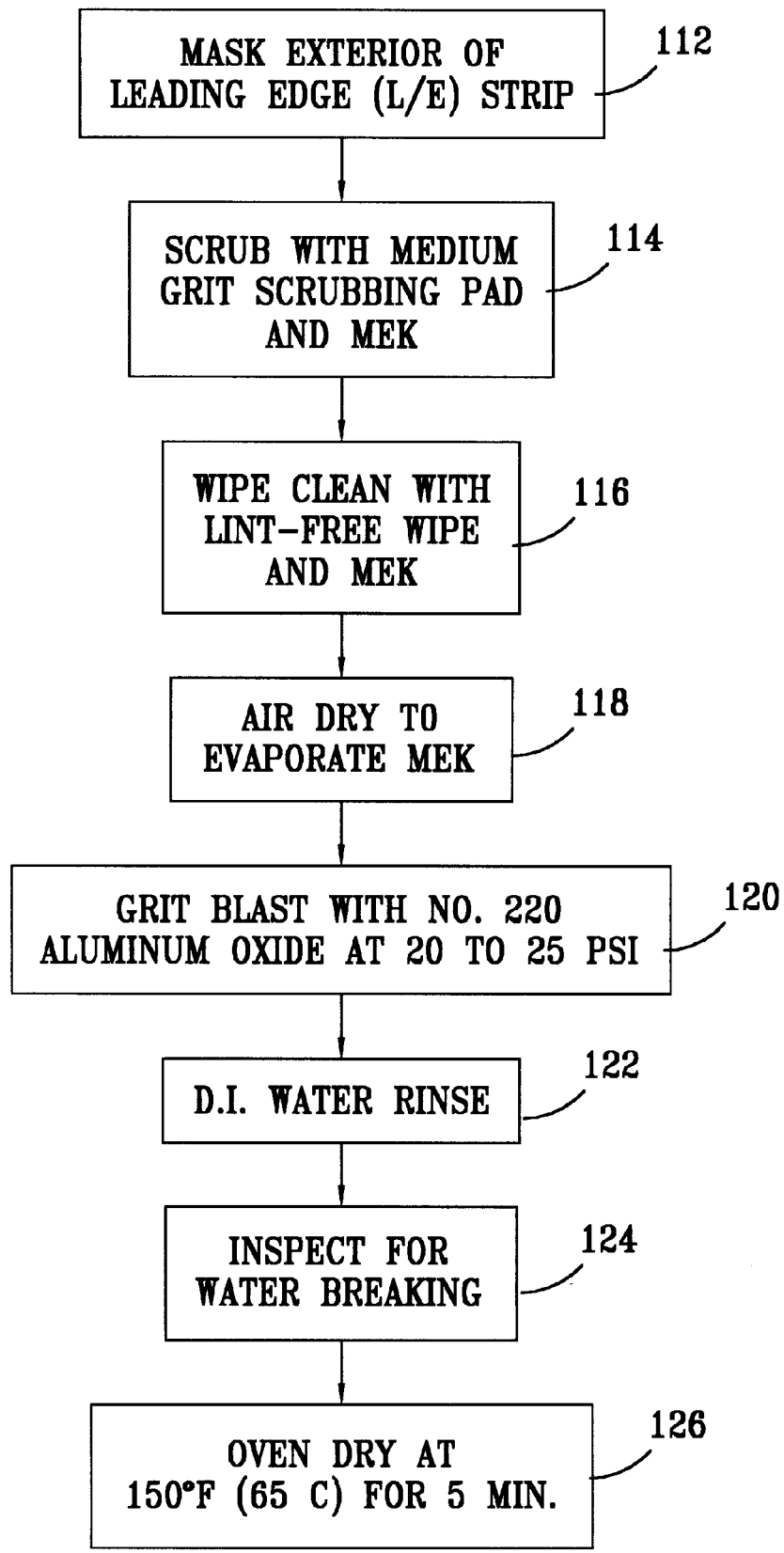
FIG. 11 illustrates a block diagram of a process for preparing the supplemental leading edge abrasion strip for mounting to a composite, helicopter rotor blade according to the present invention.

Referring now to FIG. 11, there is illustrated a block diagram of the method for preparing the bonding surface of the supplemental leading edge abrasion wear strip 32 corresponding to the block 84 of FIG. 9. In block 112, the exterior of the leading edge strip 32, which is on the opposite side of the supplemental leading edge abrasion strip 32 than the bonding surface, is masked to prevent adhesion of adhesives 48 thereto. Then, the bonding surface of the leading edge abrasion wear strip 32 is scrubbed with a medium-grit scrubbing pad and MEK, as depicted in block 114. Then, as depicted in block 116, the bonding surface of the leading edge abrasion wear strip 32 is wiped clean with a lint-free wipe, according to the procedure set forth above for the block 100 of FIG. 10. The leading edge strip 32 is cleaned until the bonding surface has a lusterless gray appearance, utilizing a new wipe after each pass. Then, as depicted in block 118, the supplemental leading edge abrasion wear strip 32 is allowed to air dry to evaporate the MEK. In block 120, the bonding surfaces of the leading edge abrasion strip 32 are then grit-blasted with a No. 220 aluminum oxide at 20 to 25 psi. Then, the bonding surface of the supplemental leading edge abrasion wear strip 32 is rinsed with DI water, as depicted in block 122, and later inspected for water-breaking, as depicted in block 124, during the end portion of the DI water rinse of the block 122. Once water-breaking does not occur, the strip 32 is oven-dried at 150° F. (65° F.) for five minutes, as depicted in block 126.

Figure 12:
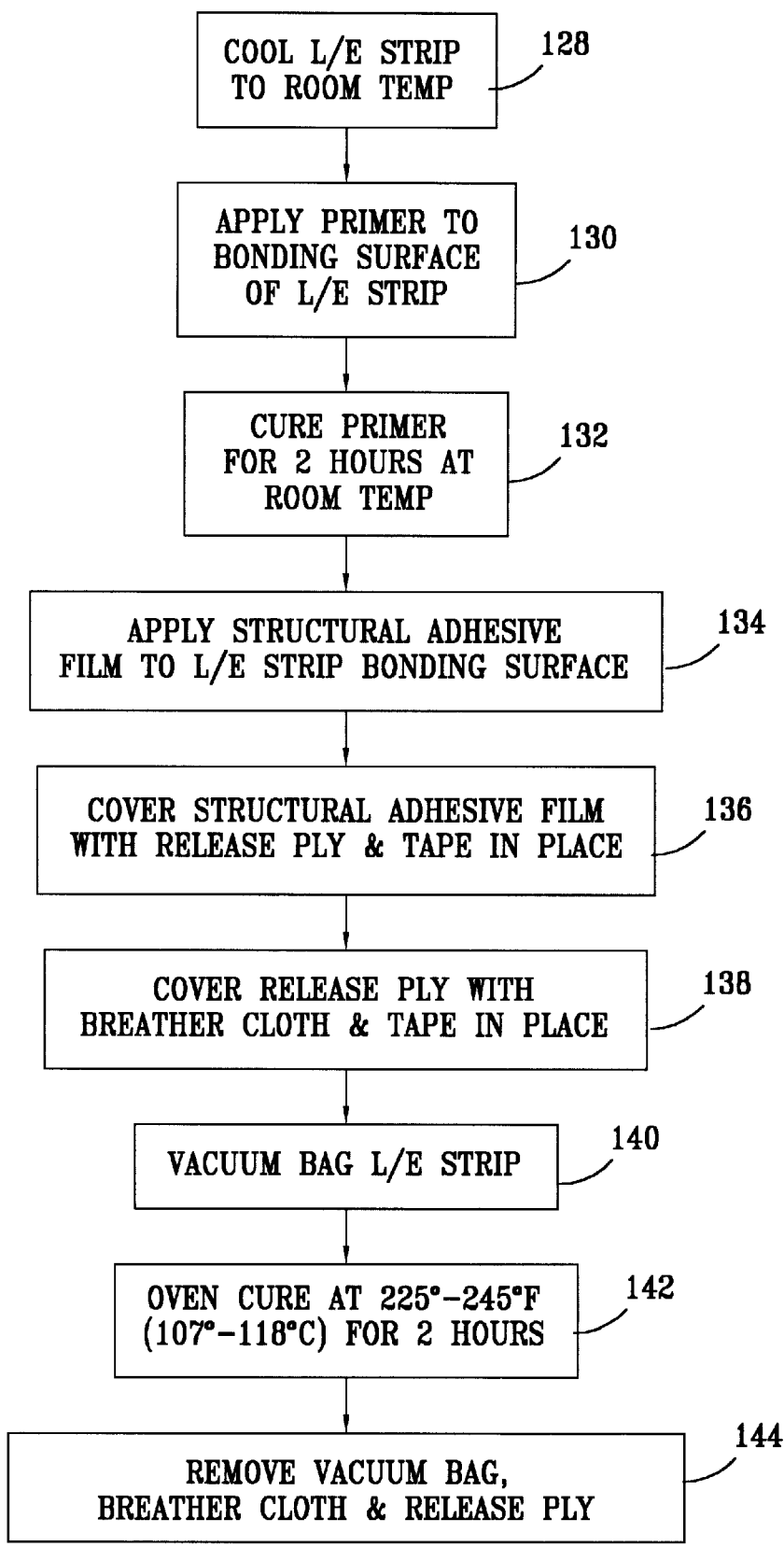
FIG. 12 illustrates a block diagram of a process for bonding a structural adhesive film to the bonding surfaces of the supplemental leading edge abrasion strip according to the present invention.

Referring now to FIG. 12, there is illustrated a block diagram of the method for hot bonding the structural adhesive film 50 to the supplemental leading edge abrasion wear strip 32 corresponding to the block 86 of FIG. 9. The supplemental leading edge abrasion wear strip 32 is removed from the oven after the oven dry step depicted in the block 126 of FIG. 11, and then air cooled to room temperature, as depicted in block 128. The primer 54 is then applied to the bonding surface of the supplemental leading edge abrasion strip 32 by painting a thin, even coat of the corrosion-inhibiting primer 54 upon the bonding surfaces of the supplemental leading edge abrasion wear strip 32. The primer 54 is then cured for two hours at room temperature, as depicted in block 132. Block 134 depicts the step of applying the structural adhesive film 50 to the bonding surface of the supplemental leading edge abrasion wear strip 32. Then, in block 136, the supplemental leading edge abrasion strip 32 and the structural adhesive 50, which has been placed in the appropriate position on the bonding surface of the supplemental leading edge abrasion strip 32, are covered with a release ply fabric similar to the release ply fabric 64 of FIG. 8, and both the release ply and the structural adhesive film 50 are taped in place. In block 138, the release fabric is covered with a breather cloth, which is also taped in place. Then, in block 140, the supplemental leading edge strip 32 is vacuum-bagged, utilizing International Plastic Products Bagging Film 6400 and AIRTECH® Vacuum Bagging Sealant Tape GS-213, with a vacuum valve inserted for drawing a vacuum upon the bag during curing. In block 142, the supplemental leading edge abrasion wear strip 32 is placed in an oven, and the structural adhesive film 50 is oven-cured at 225° F. (107° C.) to 245° F. (118° C.) for two hours, to hot bond the adhesive film 50 to the supplemental leading edge strip 32. Then, after removal from the oven, the vacuum-bagging, the breather cloth, and the release fabric are all removed from the supplemental leading edge wear strip 32 as depicted in block 144.

Figure 13:
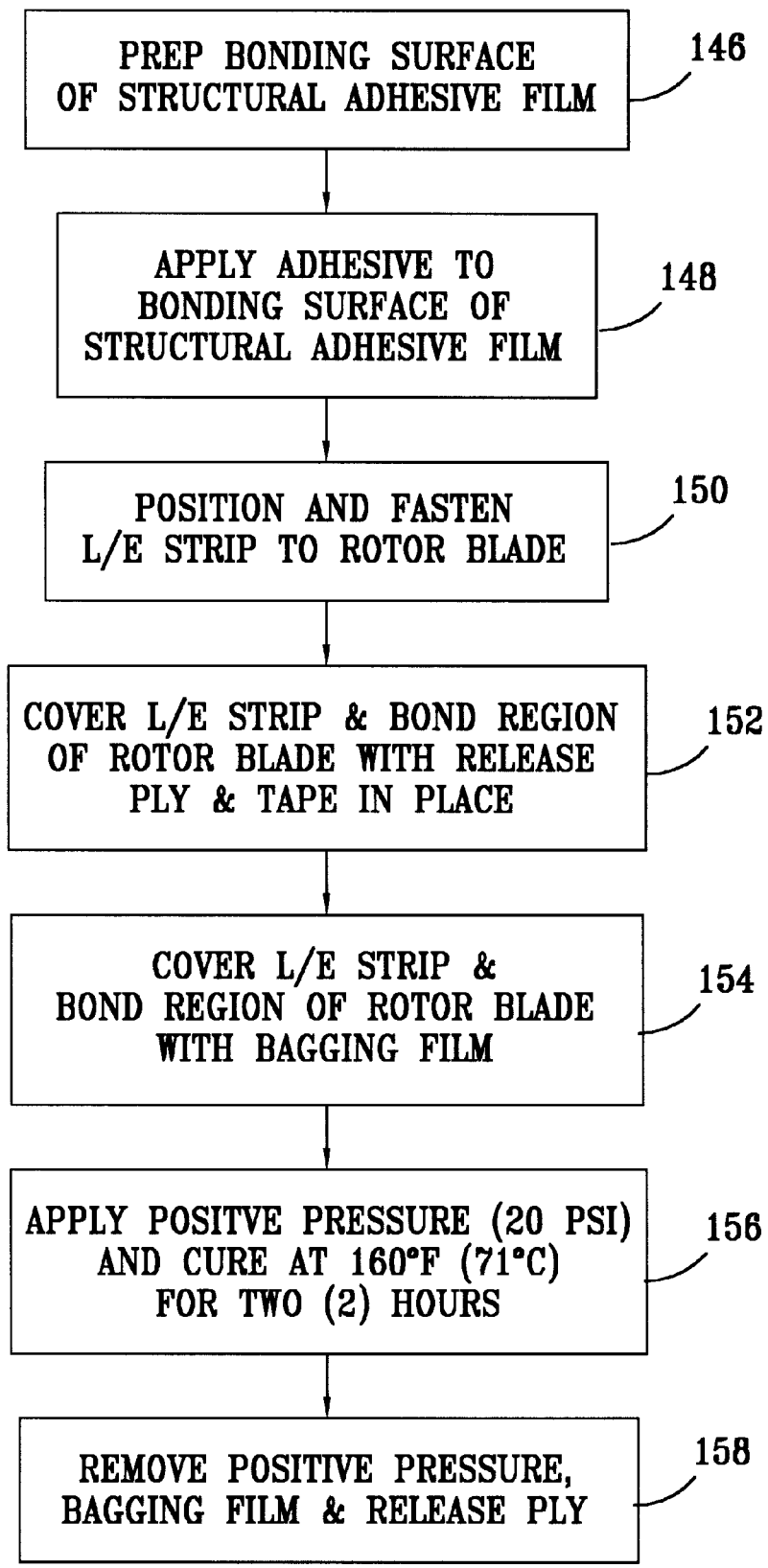
FIG. 13 illustrates a block diagram of a process for bonding the structural adhesive film of the supplemental leading edge abrasion strip to the bonding surfaces of the composite, helicopter rotor blade according to the present invention.

Referring now to FIG. 13, there is illustrated the method of bonding the supplemental leading edge abrasion strip 32 to the leading edge 42 of the composite rotor blade 40 corresponding to the block 88 of FIG. 9. In block 146, the bonding surface of the structural adhesive film 50 is prepared for bonding to the composite rotor blade 40 by abrading the bonding surface, wiping the bonding surface with MEK, and then allowing the MEK to evaporate for five minutes. This bonding surface of the structural adhesive film 50 is the opposite side of the film from that which was bonded to the supplemental leading edge strip 32 in block 86 of FIG. 9. In block 148, an adhesive mix 52 is applied to the bonding surface of the structural adhesive film 50, which is mounted to the supplemental leading edge abrasion wear strip 32. Then, the supplemental leading edge abrasion strip 32 is placed into the appropriate final position on the leading edge 42 of the composite rotor blade 40, as depicted in FIGS. 5 and 6, and indicated in block 150. The supplemental leading edge abrasion strip 32 is fastened in the appropriate position using high temperature tape. Then, as depicted in block 152, the supplemental leading edge abrasion wear strip 32 and the transition region 62 are covered with a release ply fabric 64, and then the release ply fabric 64 and the supplemental leading edge abrasion wear strip 32 are taped in place. In block 154, a bagging film 66 is placed over the release ply fabric 64, the supplemental leading edge abrasion strip 32 and the composite rotor blade 40.

In block 156, the composite rotor blade 40 and the supplemental leading edge abrasion wear strip 32, which are covered with the release ply fabric 64 and the bagging film 66, are placed into an air bladder 58 and fixturing 74, and then a positive pressure of 20 psi is applied to the surface of the supplemental leading edge abrasion wear strip 32, the rotor blade 40 and the transition section 62 therebetween, as depicted in FIG. 8. The adhesive mix 52 is cured at a lower temperature than the above-listed hot bond temperature. The epoxy adhesive mix is cured at 160° F. (71° C.) for approximately two hours while the positive pressure is applied to the surface of the supplemental leading edge abrasion wear strip 32, the composite rotor blade 40, and the transition section 62 extending therebetween. In block 158, the positive pressure tooling 56 is removed, as well as the bagging film/plastic wrap 66 and the release ply 64. Then, as depicted in block 90 of FIG. 9, the transition section 62 is faired, such that a smooth contour is provided between the trailing edges 36 of the supplemental leading edge abrasion strip 32 and the adjacent portions of the composite rotor blade 40 to prevent turbulence during operation of the composite rotor blade 40.

The present invention provides several advantages over the prior art. A supplemental leading edge abrasion strip is applied to a composite rotor blade with a structural integrity such that the useful life of the rotor blade may be extended. The supplemental leading edge abrasion strip is electroformed of nickel and has a profile of an asymmetrically contoured shape which matches that of the leading edge of the rotor blade. Since the rotor blade is made of composite materials, it is susceptible to deterioration if exposed to the high temperatures that are required to cure a structural adhesive using a hot bond cure. Instead, a structural adhesive film is first bonded to the leading edge abrasion strip using a hot bond cure to provide a structural bond to the nickel of the supplemental leading edge abrasion strip prior to bonding the nickel abrasion strip to the composite rotor blade. This allows curing of the structural adhesive to the surface of the nickel of the leading edge abrasion strip at the high, hot bond temperatures which would degrade the composite materials of the composite rotor blade, such that a structural bond of sufficient integrity and strength is provided to enable the electroformed nickel leading edge abrasion strip to remain bonded to the leading edge of an outboard portion of a rotor blade when exposed to the high speed rotational forces of a helicopter rotor blade. Then, the supplemental leading edge abrasion strip is adhesively bonded to the surface of the rotor blade by bonding the structural adhesive film directly to the rotor blade using a lower temperature than that which is used to provide a hot bond cure, such that the composite materials of the rotor blade can sustain the cure temperatures without structural degradation. Additionally, the transition interfaces between the trailing edges of the supplemental leading edge abrasion strip and the composite rotor blade are aerodynamically contoured and shaped such that they will not interfere with normal operation of the rotor blade.

Although the preferred embodiment has been described in detail, it should be understood that various changes, substitutions and alterations can be made therein without departing from the spirit and scope of the invention as defined by the appended claims.

What is claimed is:

1. A method for repairing an outboard leading edge of a composite, helicopter rotor blade, comprising the steps of:

providing a supplemental leading edge abrasion wear strip formed of nickel;

preparing the outboard portion of the leading edge of the composite, helicopter rotor blade for bonding;

preparing an interior bonding surface of a supplemental leading edge abrasion wear strip for bonding;

hot bonding a structural adhesive film to the interior bonding surface of the supplemental leading edge abrasion wear strip utilizing a high temperature cure; then bonding the structural adhesive film to the outboard portion of the surface of the leading edge of the composite, helicopter rotor blade using a structural adhesive mix and a low temperature cure with positive pressure applied to the supplemental leading edge abrasion wear strip and the composite, helicopter rotor blade to bond the supplemental leading edge wear abrasion strip to the composite, helicopter rotor blade; and fairing the run out of the structural adhesive mix to contour a transition section gap extending between a trailing edge of the supplemental leading edge abrasion wear strip and a surface of the composite, helicopter rotor blade which is proximately adjacent to the trailing edge of the leading edge abrasion wear strip.

2. The method of repairing an outboard leading edge of a composite, helicopter rotor blade according to claim 1, wherein the step of preparing the outboard portion of the surface of the leading edge of the composite, helicopter rotor blade comprises the steps of:

placing the supplemental leading edge abrasion wear strip into a mounting position relative to the leading edge of the composite, helicopter rotor blade;

masking portions of the surface of the composite, helicopter rotor blade which are proximately adjacent to the trailing edges of the supplemental leading edge abrasion wear strip when the supplemental leading edge abrasion wear strip is disposed in the mounting position, with a transition section gap extending between the trailing edges and the masking;

removing the supplemental leading edge abrasion wear strip from the mounting position relative to the composite, helicopter rotor blade;

scrubbing an exterior bonding surface of the outboard portion of the surface of the composite, helicopter rotor blade to which the leading edge abrasion wear strip is to be bonded;

grit-blasting the exterior bonding surface of the outboard portion of the leading edge of the composite, helicopter rotor blade;

rinsing the outboard portion of the leading edge of the composite, helicopter rotor blade with a DI water rinse, and then during the latter portion of the DI water rinse, inspecting for water-breaking to determine when the outboard surface is acceptably cleaned; and drying the exterior bonding surface of the leading edge of the composite, helicopter rotor blade with a heat gun.

3. The method of repairing an outboard leading edge of a composite, helicopter rotor blade according to claim 1, wherein the step of preparing the interior bonding surface of the supplemental leading edge abrasion wear strip comprises the steps of:

scrubbing the interior bonding surface of the supplemental leading edge abrasion wear strip with a medium-grit scrubbing pad and a solvent;

grit-blasting the interior bonding surface of the supplemental leading edge abrasion wear strip;

rinsing the interior bonding surface of the supplemental leading edge abrasion wear strip with a DI water rinse, and inspecting for water-breaking at the latter portion of the DI water rinse to assure cleanliness of the interior bonding surface of the supplemental leading edge abrasion wear strip; and drying the interior bonding surface of the supplemental leading edge abrasion wear strip.

4. The method of repairing an outboard leading edge of a composite, helicopter rotor blade according to claim 1, wherein the step of bonding the structural adhesive film to the interior bonding surface of the supplemental leading edge abrasion wear strip comprises the steps of:

applying a primer to the interior bonding surface of the supplemental leading edge abrasion wear strip;

curing the primer;

applying a first side of the structural adhesive film to the interior bonding surface of the supplemental leading edge abrasion wear strip;

covering the structural adhesive film with a release ply fabric and taping the structural adhesive film and the release ply fabric in place relative to the bonding surface of the supplemental leading edge abrasion wear strip;

covering the release ply fabric with a breather cloth;

vacuum-bagging the supplemental leading edge abrasion wear strip, the structural adhesive film, the release ply fabric and the breather cloth, with the release ply fabric and the breather cloth covering the supplemental leading edge abrasion wear strip and the structural adhesive film; and curing the structural adhesive film at a high temperature while applying a vacuum to the vacuum bag to hot bond the structural adhesive film to the interior bonding surface of the supplemental leading edge abrasion wear strip.

5. The method of repairing an outboard leading edge of a composite, helicopter rotor blade according to claim 4, wherein the step of hot bonding the structural adhesive film to the interior bonding surface of the supplemental leading edge abrasion wear strip is performed at temperatures within a range of 225° F. to 245° F.

6. The method of repairing an outboard leading edge of a composite, helicopter rotor blade according to claim 1, wherein the step of bonding the structural adhesive film to the composite, helicopter rotor blade to bond the supplemental leading edge abrasion wear strip to the composite, helicopter rotor blade at the low temperature comprises the steps of:

preparing a surface of a second side of the structural adhesive film for bonding;

applying an adhesive mixture to the second side of the structural adhesive film;

positioning and then fastening the supplemental leading edge abrasion wear strip and the structural adhesive film to the composite, helicopter rotor blade in the proper position for permanently bonding thereto;

covering the supplemental leading edge abrasion wear strip and a bond region of the composite, helicopter rotor blade with a release ply fabric, and then taping the release ply fabric and the supplemental leading edge abrasion wear strip in place;

covering the supplemental leading edge abrasion wear strip, the bond region of the composite, helicopter rotor blade and the release ply fabric with a plastic bagging film;

applying the positive pressure to the supplemental leading edge abrasion wear strip and at least a portion of the composite, helicopter rotor blade; and curing the structural adhesive mix as the positive pressure is applied to the supplemental leading edge abrasion wear strip and the portion of the helicopter rotor blade.

7. The method for repairing an outboard leading edge of a composite, helicopter rotor blade according to claim 6, wherein the step of curing the structural adhesive mix at the low temperature is performed by applying a temperature of approximately 160° F. to the structural adhesive mix for two hours.

8. The method of repairing an outboard leading edge of a composite, helicopter rotor blade according to claim 1, wherein:

the step of hot bonding the structural adhesive film to the supplemental leading edge abrasion wear strip at the high temperature is performed at temperatures within a range of 225° F. to 245° F.; and the step of bonding the structural adhesive film to the composite, helicopter rotor blade with the structural adhesive mix and the low temperature cure is performed by applying a temperature of approximately 160° F. to the structural adhesive mix for two hours.

9. A method for repairing an outboard leading edge of a composite, helicopter rotor blade, comprising the steps of:

providing a supplemental leading edge abrasion wear strip formed of nickel;

placing the supplemental leading edge abrasion wear strip into a mounting position relative to the leading edge of the composite, helicopter rotor blade;

masking portions of the surface of the composite, helicopter rotor blade which are proximately adjacent to the trailing edges of the supplemental leading edge abrasion wear strip when the supplemental leading edge abrasion wear strip is disposed in the mounting position, with a transition section gap extending between the trailing edges and the masking;

removing the supplemental leading edge abrasion wear strip from the mounting position relative to the composite, helicopter rotor blades;

scrubbing an exterior bonding surface of the outboard portion of the surface of the composite, helicopter rotor blade to which the leading edge abrasion wear strip is to be bonded;

grit-blasting the exterior bonding surface of the outboard portion of the leading edge of the composite, helicopter rotor blade;

rinsing the outboard portion of the leading edge of the composite, helicopter rotor blade with a DI water rinse, and then during the latter portion of the DI water rinse, inspecting for water-breaking to determine when the outboard surface is acceptably cleaned;

drying the exterior bonding surface of the leading edge of the composite, helicopter rotor blade with a heat gun;

scrubbing an interior bonding surface of the supplemental leading edge abrasion wear strip with a medium-grit scrubbing pad and a solvent;

grit-blasting the interior bonding surface of the supplemental leading edge abrasion wear strip;

rinsing the interior bonding surface of the supplemental leading edge abrasion wear strip with a DI water rinse, and inspecting for water-breaking at the latter portion of the DI water rinse to assure cleanliness of the interior bonding surface of the supplemental leading edge abrasion wear strip;

drying the interior bonding surface of the supplemental leading edge abrasion wear strip;

preparing an interior bonding surface of a supplemental leading edge abrasion wear strip for bonding;

hot bonding a structural adhesive film to the interior bonding surface of the supplemental leading edge abrasion wear strip utilizing a high temperature oven cure; then bonding the structural adhesive film to the outboard portion of the surface of the leading edge of the composite, helicopter rotor blade using a structural adhesive mix and a low temperature cure with positive pressure applied to the supplemental leading edge abrasion wear strip and the composite, helicopter rotor blade to bond the supplemental leading edge abrasion wear strip to the composite, helicopter rotor blade; and fairing the run out of the structural adhesive mix to contour a transition section gap extending between a trailing edge of the supplemental leading edge abrasion wear strip and a surface of the composite, helicopter rotor blade which is proximately adjacent to the trailing edge of the leading edge abrasion wear strip.

10. The method for repairing an outboard leading edge of a composite, helicopter rotor blade according to claim 9, wherein the step of bonding the structural adhesive film to the interior bonding surface of the supplemental leading edge abrasion wear strip comprises the steps of:

applying a primer to the interior bonding surface of the supplemental leading edge abrasion wear strip;

curing the primer;

applying a first side of the structural adhesive film to the interior bonding surface of the supplemental leading edge abrasion wear strip;

covering the structural adhesive film with a release ply fabric and taping the structural adhesive film and the release ply fabric in place relative to the bonding surface of the supplemental leading edge abrasion wear strip;

covering the release ply fabric with a breather cloth;

vacuum-bagging the supplemental leading edge abrasion wear strip, the structural adhesive film, the release ply fabric and the breather cloth, with the release ply fabric and the breather cloth covering the supplemental leading edge abrasion wear strip and the structural adhesive film; and curing the structural adhesive film at a high temperature while applying a vacuum to the vacuum bag to hot bond the structural adhesive film to the interior bonding surface of the supplemental leading edge abrasion wear strip.

11. The method for repairing an outboard leading edge of a composite, helicopter rotor blade according to claim 9, wherein the step of bonding the structural adhesive film to the composite, helicopter rotor blade to bond the supplemental leading edge abrasion wear strip to the composite, helicopter rotor blade at the low temperature comprises the steps of:

preparing a surface of a second side of the structural adhesive film for bonding;

applying an adhesive mixture to the second side of the structural adhesive film;

positioning and then fastening the supplemental leading edge abrasion wear strip and the structural adhesive film to the composite, helicopter rotor blade in the proper position for permanently bonding thereto;

covering the supplemental leading edge abrasion wear strip and a bond region of the composite, helicopter rotor blade with a release ply fabric, and then taping the release ply fabric and the supplemental leading edge abrasion wear strip in place;

covering the supplemental leading edge abrasion wear strip, the bond region of the composite, helicopter rotor blade and the release ply fabric with a plastic bagging film;

applying the positive pressure to the supplemental leading edge abrasion wear strip and at least a portion of the composite, helicopter rotor blade; and curing the structural adhesive mix as the positive pressure is applied to the supplemental leading edge abrasion wear strip and the portion of the helicopter rotor blade.

12. The method for repairing an outboard leading edge of a composite, helicopter rotor blade according to claim 9, wherein the step of bonding the structural adhesive film to the interior bonding surface of the supplemental leading edge abrasion wear strip comprises the steps of:

applying a primer to the interior bonding surface of the supplemental leading edge abrasion wear strip;

curing the primer;

applying a first side of the structural adhesive film to the interior bonding surface of the supplemental leading edge abrasion wear strip;

covering the structural adhesive film with a release ply fabric and taping the structural adhesive film and the release ply fabric in place relative to the bonding surface of the supplemental leading edge abrasion wear strip;

covering the release ply fabric with a breather cloth;

vacuum-bagging the supplemental leading edge abrasion wear strip, the structural adhesive film, the release ply fabric and the breather cloth, with the release ply fabric and the breather cloth covering the supplemental leading edge abrasion wear strip and the structural adhesive film; and curing the structural adhesive film at temperatures within a range of 225° F. to 245° F. while applying a vacuum to the vacuum bag to hot bond the structural adhesive film to the interior bonding surface of the supplemental leading edge abrasion wear strip.

13. The method for repairing an outboard leading edge of a composite, helicopter rotor blade according to claim 9, wherein the step of bonding the structural adhesive film to the composite, helicopter rotor blade to bond the supplemental leading edge abrasion wear strip to the composite, helicopter rotor blade at the low temperature comprises the steps of:

preparing a surface of a second side of the structural adhesive film for bonding;

applying an adhesive mixture to the second side of the structural adhesive film;

positioning and then fastening the supplemental leading edge abrasion wear strip and the structural adhesive film to the composite, helicopter rotor blade in the proper position for permanently bonding thereto;

covering the supplemental leading edge abrasion wear strip and bond region of the composite, helicopter rotor blade with a release ply fabric, and then taping the release ply fabric and the supplemental leading edge abrasion wear strip in place;

covering the supplemental leading edge abrasion wear strip, the bond region of the composite, helicopter rotor blade and the release ply fabric with a plastic bagging film;

applying the positive pressure to the supplemental leading edge abrasion wear strip and at least a portion of the composite, helicopter rotor blade; and curing the structural adhesive mix a temperature of approximately 160° F. for two hours as the positive pressure is applied to the supplemental leading edge abrasion wear strip and the portion of the helicopter rotor blade.

14. The method of repairing an outboard leading edge of a composite, helicopter rotor blade according to claim 9, wherein:

the step of hot bonding the structural adhesive film to the supplemental leading edge abrasion wear strip at the high temperature is performed at temperatures within a range of 225° F. to 245° F.; and the step of bonding the structural adhesive film to the composite, helicopter rotor blade with the structural adhesive mix and the low temperature cure is performed by applying a temperature of approximately 160° F. to the structural adhesive mix for two hours.

15. A method for repairing an outboard leading edge of a composite, helicopter rotor blade, comprising the steps of:

providing a supplemental leading edge abrasion wear strip formed of nickel;

placing the supplemental leading edge abrasion wear strip into a mounting position relative to the leading edge of the composite, helicopter rotor blade;

masking portions of the surface of the composite, helicopter rotor blade which are proximately adjacent to the trailing edges of the supplemental leading edge abrasion wear strip when the supplemental leading edge abrasion wear strip is disposed in the mounting position, with a transition section gap extending between the trailing edges and the masking;

removing the supplemental leading edge abrasion wear strip from the mounting position relative to the composite, helicopter rotor blades;

scrubbing an exterior bonding surface of the outboard portion of the surface of the composite, helicopter rotor blade to which the leading edge abrasion wear strip is to be bonded;

grit-blasting the exterior bonding surface of the outboard portion of the leading edge of the composite, helicopter rotor blade;

rinsing the outboard portion of the leading edge of the composite, helicopter rotor blade with a DI water rinse, and then during the latter portion of the DI water rinse, inspecting for water-breaking to determine when the outboard surface is acceptably cleaned;

drying the exterior bonding surface of the leading edge of the composite, helicopter rotor blade with a heat gun;

applying a first layer of primer, wherein the first layer of primer is applied to the exterior bonding surface of the leading edge of the composite, helicopter rotor blade;

curing the first layer of primer;

scrubbing an interior bonding surface of the supplemental leading edge abrasion wear strip with a medium-grit scrubbing pad and a solvent;

grit-blasting the interior bonding surface of the supplemental leading edge abrasion wear strip;

rinsing the interior bonding surface of the supplemental leading edge abrasion wear strip with a DI water rinse, and inspecting for water-breaking at the latter portion of the DI water rinse to assure cleanliness of the interior bonding surface of the supplemental leading edge abrasion wear strip;

drying the interior bonding surface of the supplemental leading edge abrasion wear strip;

applying a second layer of primer, wherein the second layer of primer is applied to the interior bonding surface of the supplemental leading edge abrasion wear strip;

curing the second layer of primer;

applying a first side of the structural adhesive film to the interior bonding surface of the supplemental leading edge abrasion wear strip;

covering the structural adhesive film with a release ply fabric and taping the structural adhesive film and the release ply fabric in place relative to the bonding surface of the supplemental leading edge abrasion wear strip;

covering the release ply fabric with a breather cloth;

vacuum-bagging the supplemental leading edge abrasion wear strip, the structural adhesive film, the release ply fabric and the breather cloth, with the release ply fabric and the breather cloth covering the supplemental leading edge abrasion wear strip and the structural adhesive film;

curing the structural adhesive film at a high temperature within a range of 225° F. to 245° F. while applying a vacuum to the vacuum bag to hot bond the structural adhesive film to the interior bonding surface of the supplemental leading edge abrasion wear strip;

applying an adhesive mixture to the second side of the structural adhesive film;

positioning and then fastening the supplemental leading edge abrasion wear strip and the structural adhesive film to the composite, helicopter rotor blade in the proper position for permanently bonding thereto;

covering the supplemental leading edge abrasion wear strip and a bond region of the composite, helicopter rotor blade with a release ply fabric, and then taping the release ply fabric and the supplemental leading edge abrasion wear strip in place;

covering the supplemental leading edge abrasion wear strip, the bond region of the composite, helicopter rotor blade and the release ply fabric with a plastic bagging film;

applying the positive pressure to the supplemental leading edge abrasion wear strip and at least a portion of the composite, helicopter rotor blade;

curing the structural adhesive mix by applying a temperature of approximately 160° F. for two hours, as the positive pressure is applied to the supplemental leading edge abrasion wear strip and the portion of the helicopter rotor blade; and then, fairing the run out of the structural adhesive mix to contour a transition section gap extending between a trailing edge of the supplemental leading edge abrasion wear strip and a surface of the composite, helicopter rotor blade which is proximately adjacent to the trailing edge of the leading edge abrasion wear strip.

* * * * *